UNITED STATES PATENT OFFICE.

JOHN REICHEL, OF PHILADELPHIA, PENNSYLVANIA, ASSIGNOR TO H. K. MULFORD COMPANY, OF PHILADELPHIA, PENNSYLVANIA.

PROCESS OF PRODUCING HOG-CHOLERA SERUM-GLOBULIN.

1,197,150.   Specification of Letters Patent.   Patented Sept. 5, 1916.

No Drawing.   Application filed May 27, 1915.   Serial No. 30,803.

*To all whom it may concern:*

Be it known that I, JOHN REICHEL, a citizen of the United States, residing in Philadelphia, in the county of Philadelphia and State of Pennsylvania, have invented a new and useful Improvement in Processes of Producing Hog-Cholera Serum-Globulin, of which the following is a specification.

This invention relates to a new and useful process of refining hog cholera "antitoxin" and separating the hog cholera serum globulins and the active anti bodies from the inactive or inert substances, such as serum albumin, if preferred, and the cellular debris, fibrin and the living or dead germs contained in hog cholera "antitoxin", by the use of chemical precipitants other than those producing insoluble hydroxids, and has for an object, among others, to obtain the hog cholera serum globulins and the anti bodies, separated from hog cholera "antitoxin", and with which said hog cholera serum globulin and anti bodies hogs may be immunized against hog cholera, and hogs sick of hog cholera may be cured.

In carrying out the process, hog cholera "antitoxin" may be used in the form of defibrinated blood, serum or plasma, fresh, sterile, preserved or otherwise, and therefore the process in practice is not to be considered as restricted to any particular prepared form of hog cholera "antitoxin". Injections of virulent blood or virus, from a hog sick of hog cholera or the cause of hog cholera, into an animal immune from hog cholera, produces in the blood of the immune animal antibodies or hog cholera immune bodies which may be obtained in the defibrinated blood, serum or plasma containing many substances aside from the watery portion, such as the globulins, serum albumins, cellular debris, fibrin, living or dead germs and salts, among which the hog cholera antibodies are included as a part or are closely associated therewith. It is to the hog cholera "antitoxin" obtained in this way or to the said hog cholera "antitoxin" obtained in other ways that my new and useful process relates more particularly, and the process is carried out by the following treatment steps of hog cholera "antitoxin", in order to recover therefrom the hog cholera antibodies along with the globulins or hog cholera serum globulins separated from the serum albumins, if preferred, and the living or dead germs, cellular debris and fibrin.

The process is preferably carried out by taking a definite amount or quantity of hog cholera "antitoxin", defibrinated blood, serum or plasma, as above identified, and treating it with a chemical precipitant in whose action no hydroxid is formed or the hydroxid of which is soluble, such as ammonia sulfate, in solution preferably or in crystalline form, so that the resulting mixture shall contain practically from 20% to 30%, preferably practically 25% of a saturated solution of the chemical. In allowing the mixture to stand at least twelve hours the tonicity or consistency of the "antitoxin" is so changed as to facilitate filtration, which is accomplished by the addition of kieselguhr, an inert silicious earth, in the proportion, approximately 20% of the amount of the original volume of the serum, which I have found best suited for the purpose, under pressure. In the filtration the kieselguhr, cellular debris, fibrin and germs remain in the pressure filter and as they retain little or no hog cholera antibodies after washing, with water or a solution of the chemical originally used, the residue is subsequently discarded. The filtrate resulting from this mode of treatment will be a solution comparatively rich in hog cholera antibodies and globulins, and serum albumin, in short the filtrate will contain substantially all of the hog cholera antibodies or the immunizing portion of the hog cholera antitoxin; the filtrate is treated by bringing it up to a higher saturation of the chemical, in this instance, ammonia sulfate, giving substantially a 45% to 55% solution of a saturated solution of the chemical, to assure the precipitation of the globulins hog cholera antibodies. This mixture is allowed generally to stand over night and then placed on hard filter paper. The filtrate, including the serum albumin, is discarded; but the precipitate is retained as it includes the hog cholera serum globulins and immunizing portion or antibodies of hog cholera "antitoxin". The precipitate is blotted and pressed between paper to remove the excess of the chemical, in this instance, ammonia sulfate; and following which, the precipitate may be dried, dialyzed or brought directly into a solution by the addition of a solvent, water or weak solution of a preservative and then sterilized by filtration through filters, as for example the Berkfeld filters.

It is to be understood that the process is not to be limited to use of the chemical, ammonia sulfate, since it has been mentioned only by way of example and as one chemical for carrying out the process, and furthermore that the description of the process is that of the preferred mode of treatment, the process is not necessarily to be limited thereto, since it is plain that the process is susceptible to modification in various particulars by persons skilled in the art without departing from the spirit or scope of the process.

What I claim is:

1. The process which consists in treating hog cholera "antitoxin" with a chemical precipitant in whose action no hydroxid is formed or the hydroxid of which is soluble so that the resulting mixture shall contain practically twenty-five per cent. of the chemical, adding to the mixture kieselguhr, filtering the whole mixture under forced pressure, adding to the filtrate therefrom a chemical precipitant in whose action no hydroxid is formed or the hydroxid of which is soluble to bring the mixture practically to a fifty per cent. solution of the chemical and recovering by filtration the precipitate.

2. In the art of treating hog cholera "antitoxin", the process which consists in treating hog cholera "antitoxin" with a chemical precipitant in whose action no hydroxid is formed or the hydroxid of which is soluble so that the resulting mixture shall contain from twenty per cent. to thirty per cent. or practically twenty-five per cent. of the chemical, adding to the mixture inert silicious earth, filtering the whole mixture under forced pressure, adding to the filtrate therefrom a chemical precipitant in whose action no hydroxid is formed or the hydroxid of which is soluble to bring the mixture practically to a degree of saturation of the chemical from forty-five per cent. to fifty-five per cent. of a saturated solution, and recovering by filtration the precipitate substantially as described.

3. In the art of treating hog cholera "antitoxin", the process which consists in treating hog cholera "antitoxin" with a chemical precipitant in whose action no hydroxid is formed or the hydroxid of which is soluble so that the resulting mixture shall contain from twenty per cent. to thirty per cent. or practically twenty-five per cent. of the chemical, adding to the mixture inert silicious earth, filtering the whole mixture under forced pressure, adding to the filtrate therefrom a chemical precipitant in whose action no hydroxid is formed or the hydroxid of which is soluble to bring the mixture up to a degree of saturation of the chemical, from forty-five to fifty-five per cent. of a saturated solution, to assure precipitation of the globulins and hog cholera antibodies, and recovering the same by filtration and removing the excess of the chemical precipitant from the precipitate, substantially as described.

4. In the art of treating hog cholera "antitoxin", the process which consists in treating hog cholera antitoxin with a chemical precipitant in whose action no hydroxid is formed or the hydroxid of which is soluble so that the resulting mixture shall contain from twenty per cent. to thirty per cent. or practically twenty-five per cent. of the chemical, adding to the mixture inert silicious earth, filtering the whole mixture under forced pressure, adding to the filtrate therefrom a chemical precipitant in whose action no hydroxid is formed or the hydroxid of which is soluble to bring the mixture up to a degree of saturation of the chemical, from forty-five to fifty-five per cent. of a saturated solution to assure the precipitation of the globulins and hog cholera antibodies, and recovering the same by filtering, removing the excess of the chemical precipitant from the precipitate, and dissolving the precipitate in a water or weak solution of a preservative, substantially as described.

5. In the art of treating hog cholera "antitoxin", the process which consists in treating hog cholera antitoxin with a chemical precipitant in whose action no hydroxid is formed or the hydroxid of which is soluble so that the resulting mixture shall contain from twenty per cent. to thirty per cent. or practically twenty-five per cent. of the chemical, adding to the mixture inert silicious earth, filtering the whole mixture under forced pressure, adding to the filtrate therefrom a chemical precipitant in whose action no hydroxid is formed or the hydroxid of which is soluble to bring the mixture up to a degree of saturation of the chemical from forty-five to fifty-five per cent. of a saturated solution, to assure the precipitation of the globulins and hog cholera antibodies, and recovering the same by filtration, and removing the excess of the chemical precipitant from the precipitate, dissolving the precipitate in a weak solution of a preservative, and filtering the same through a sterilizing filter.

In testimony whereof, I have signed my name to this specification in the presence of two subscribing witnesses.

JOHN REICHEL.

Witnesses:
G. JONES,
L. V. MASON.